Nov. 3, 1936.  C. S. BRANDENBURG  2,059,546
MEANS FOR SEPARATING AND DELIVERING CONTAINERS
Filed May 14, 1932  3 Sheets-Sheet 1
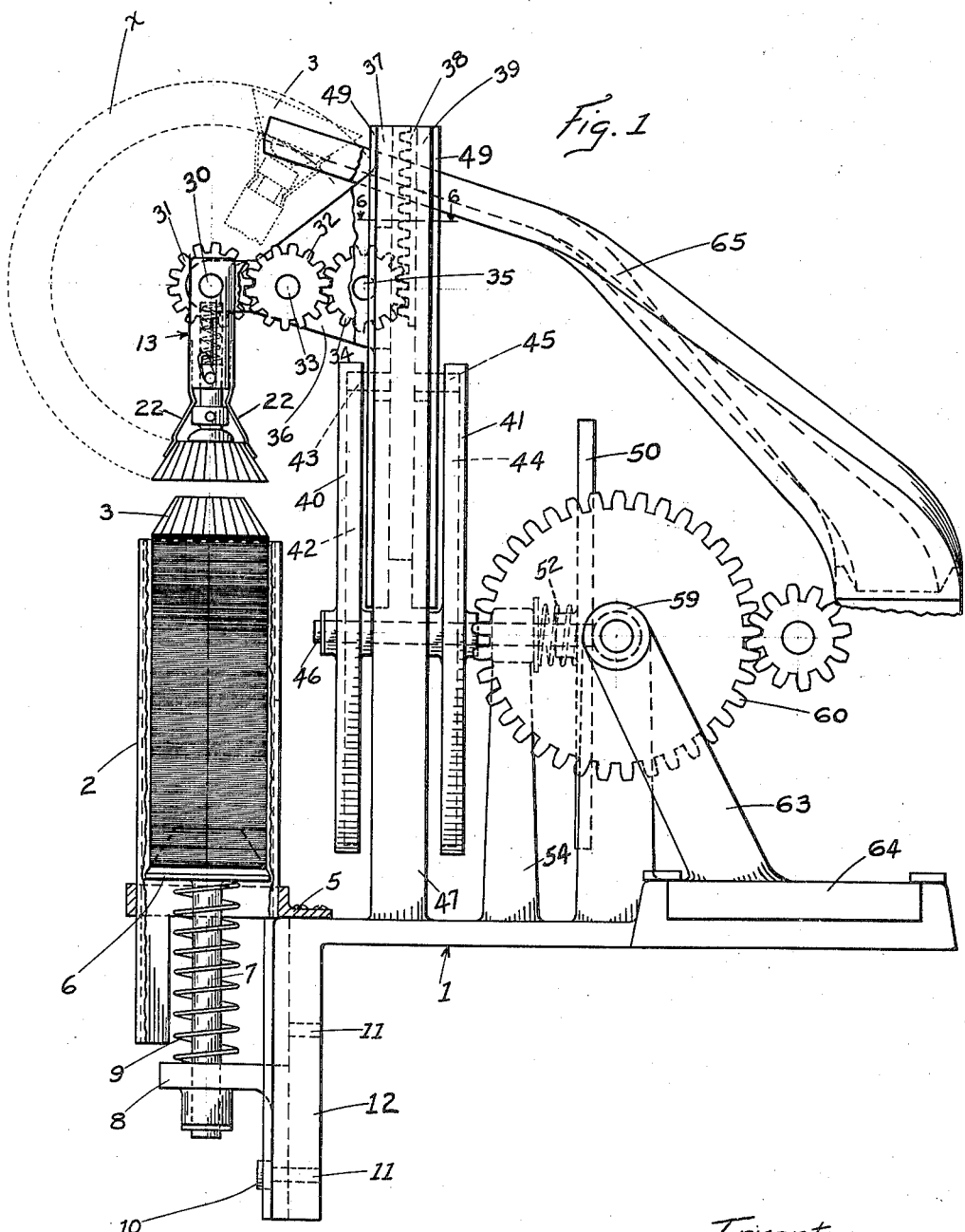
Inventor
Clyde S. Brandenburg
by Wallace R. Lane
Atty.

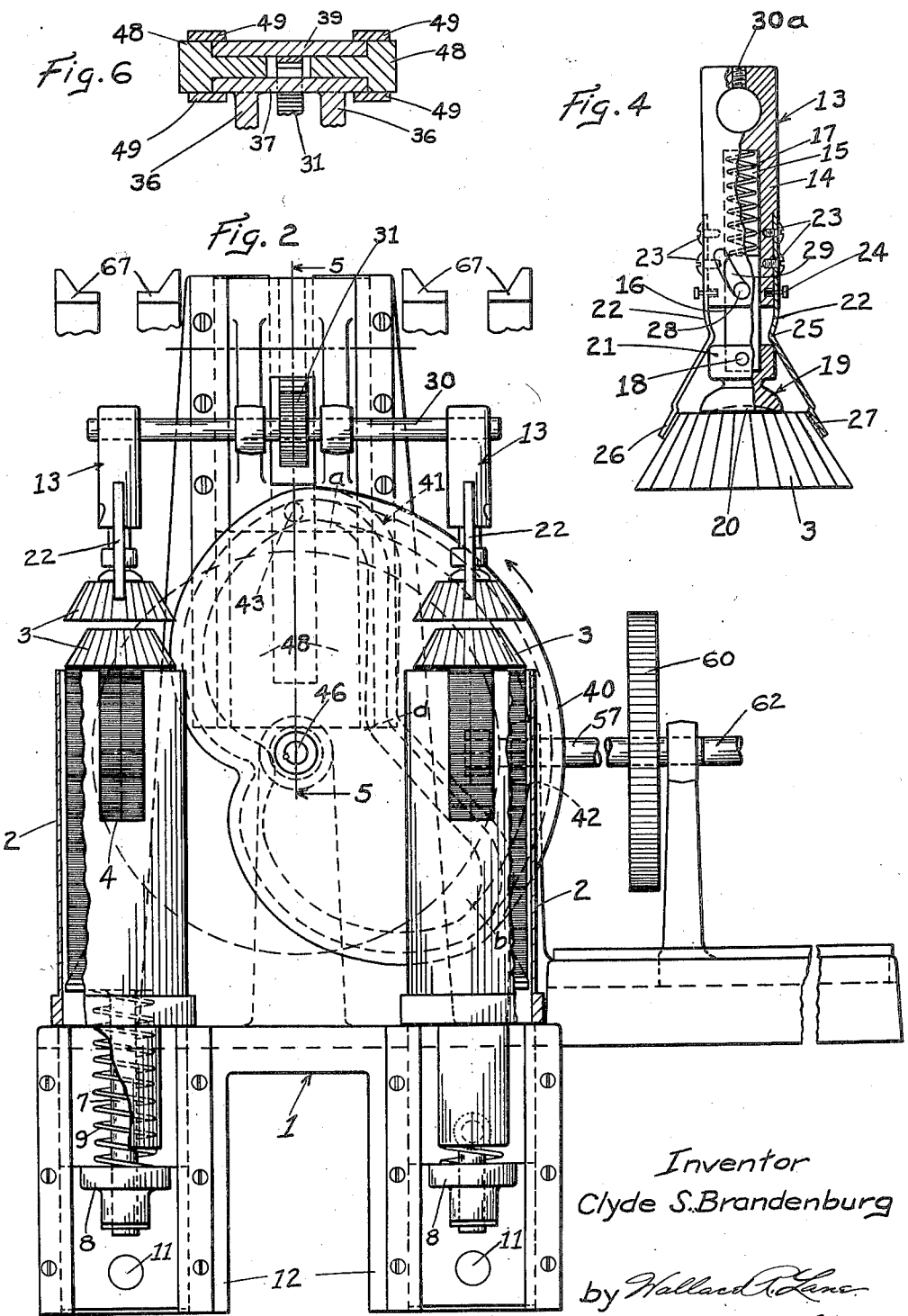

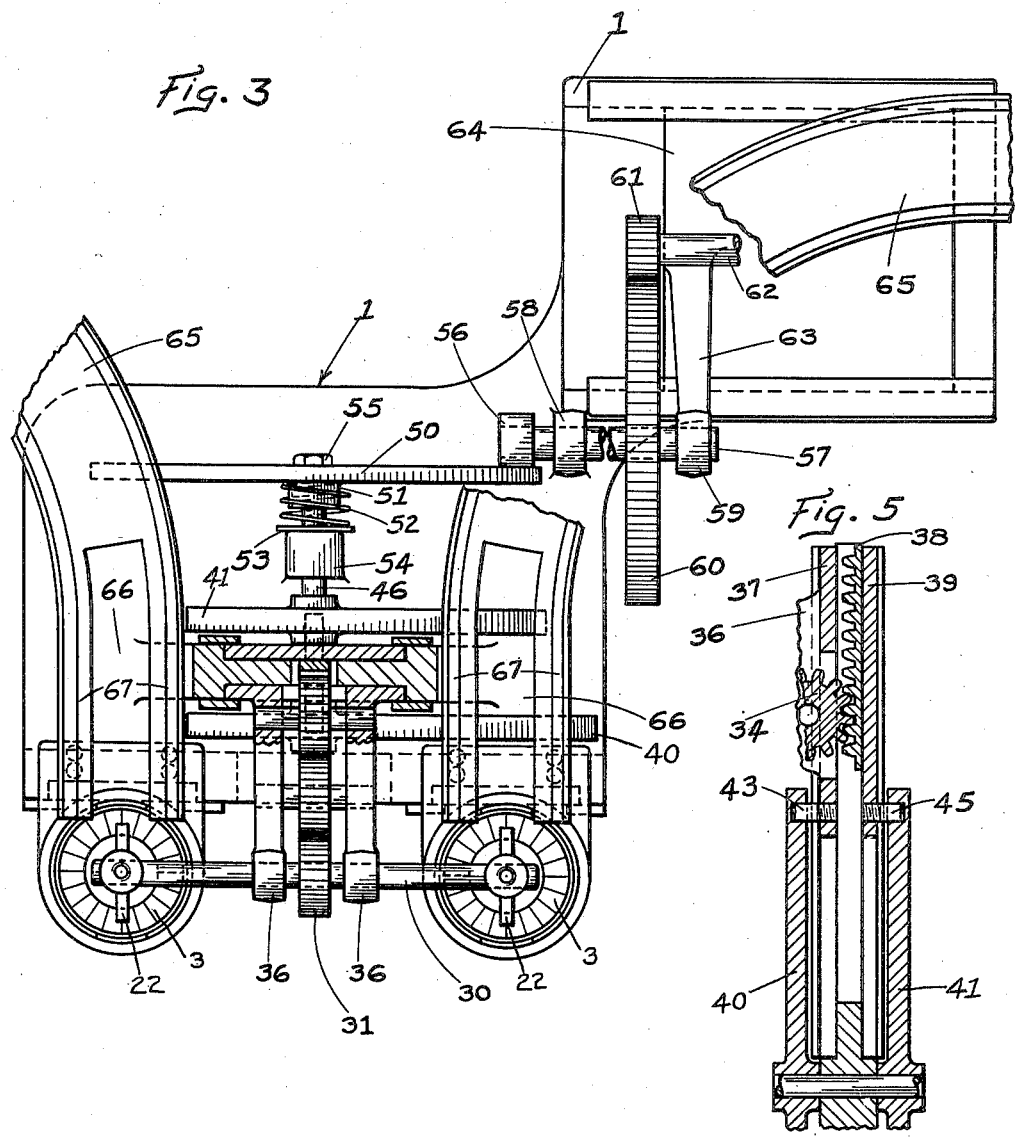

Patented Nov. 3, 1936

2,059,546

UNITED STATES PATENT OFFICE 2,059,546

MEANS FOR SEPARATING AND DELIVERING CONTAINERS

Clyde S. Brandenburg, Chicago, Ill.

Application May 14, 1932, Serial No. 611,336

20 Claims. (Cl. 214—8.5)

The present invention relates to a novel means and method of separating and delivering containers, and more in particular to such a means and method adapted for separating and delivering paper cups or other containers which come packed in tightly nested arrangement and are adapted to receive candy, food products and other articles or commodities. In the method of packing such articles now in general use, the operator employs one hand to separate the containers or cups from the stack, and the other to pack the product therein. Or, two operators are employed, one to separate the containers and the other to pack them. Both methods are exceptionally slow and tedious, and are a considerable item in the cost of production, it being understood that the cups or containers come tightly nested together and difficulty is encountered in separating them, thus resulting in a great loss of time as well as energy.

The principal object of the present invention is the provision of a novel means and method for automatically separating and delivering the containers or cups in a position for ready insertion of the product or article to be packed. In the present means and method, the operator or operators merely need to pack the product or article as the cups are delivered to them in upright position, instantly available for packing.

Another object of the invention is the provision of a novel pick-up or separating and delivery assembly adapted to positively separate the individual containers or cups from the nested pack, swing them on an arc so as to place them in an upright position available for packing and discharging them upon a chute or other device for delivering them to the operator. In the present embodiment, the machine is disclosed as provided with dual units, although it is to be understood that the assembly may comprise but a single unit, or as many units as desired or practical.

Still another object is the provision of a novel cam-operated mechanism for operating, regulating and timing the stroke or path of the pick-up or separating and delivery assembly.

Another object of the invention is the provision of a novel drive mechanism for the machine. The present embodiment contemplates the employment of a friction drive adapted to be readily adjusted for varying the speed of operation of the separating and delivering mechanism through a wide range.

Still another object is the provision of a novel mounting for the nested containers or cups. The present mounting is made adjustable to permit the housing for the containers or cups to retain a considerable number thereof without refilling. The containers or cups are mounted on a spring plunger so that a cup is always in position to be separated and delivered to the conveyor or conveyors.

Further objects are to provide a construction of maximum simplicity, efficiency, economy and ease of assembly and operation; and such further objects, advantages and capabilities as will later more fully appear, and are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other details and constructions, without departing from the spirit of the invention.

In the drawings;

Fig. 1 is a view in side elevation of the novel means and mechanism.

Fig. 2 is a view in front elevation of the novel structure disclosed in Fig. 1.

Fig. 3 is a fragmentary top plan view of the structure shown in Figs. 1 and 2.

Fig. 4 is a view, part in side elevation, and part in vertical cross section, through the separating assembly or pick-up device.

Fig. 5 is a fragmentary view in vertical cross section through the rack and gear mechanism, taken in a plane represented by the line 5—5 of Fig. 2.

Fig. 6 is a view in horizontal cross section taken in a plane represented by the line 6—6 of Fig. 1.

Referring more particularly to the disclosure in the drawings, the novel means and mechanism for separting and delivering the containers is disclosed as provided with a frame or base 1. Mounted upon the forward portion of the mechanism is a pair of spaced casings or receptacles 2 adapted to receive a stack or pack of containers such as paper cups or the like 3. These paper cups or containers are disclosed as in inverted position and tightly nested together so that they are normally difficult to separate. Each receptacle or casing is provided with a slotted portion 4 at the front and rear thereof, the purpose of which will be later more fully explained. Each receptacle or casing is mounted at 5 upon the frame, the lower end of the receptacle or casing being open to receive a plunger 6 adapted to be received within the lowermost receptacle or cup in the stack, the pin or rod 7 of the plunger slidably seating within an adjustable slide 8, but so mounted as to prevent turning therein. The head of the plunger is corrugated in a manner similar to the corrugations in the cups or container 3 so as to prevent the stack from turning or shifting.

A spring 9 encompasses the pin or rod 7 and seats against the slide or support 8 and the plunger or head 6 so as to normally retain the plunger in an upwardly extended position. A pin 10 adapted to seat within one of the spaced openings 11 in the extension 12 of the frame, retains the support 8 in any desired position. By reason of this construction, the casing or receptacles 2 may be filled to a greater capacity since the support may initially be placed in a position where the pin 10 seats within the lowermost opening 11. As the stack of paper cups or containers is decreased, this support 8 may be raised into an upper position so as to always maintain the uppermost cup or receptacle in a position within the stroke of the pick-up mechanism or separating assembly.

The pick-up assembly 13 is more clearly disclosed in Fig. 4, and comprises a casing 14 which is hollowed at 15 for a portion of its length for the reception of a plunger 16. A spring 17 seats within the upper portion of the opening 15 and against the upper end of the plunger 16 so as to normally depress this plunger. Mounted upon the lower end of the plunger 16 as by means of a pin 18 or the like, is provided a member 19 formed of rubber or other suitable material which may be concaved as at 20 whereby to form a vacuum cup or gripping surface. At its upper end, the member 19 is provided with an enlargement 21 of considerably greater cross-section than the plunger. This enlargement is adapted to seat against a pair of arms or spring fingers 22 mounted on opposite sides of the casing 14 as by means of screws 23 or other retaining means. Adjusting screws 24 are provided for the spring fingers whereby to adjust or regulate the tension produced by the fingers on the container or cup 3 which is being separated and withdrawn. These arms or spring fingers are bent inwardly as at 25 and then outwardly, the ends 26 thereof being provided with pads 27 of rubber, leather, felt, or any other material having a high frictional resistance so as to form a good gripping surface with the sides of the container or cup 3.

The pick-up devices 13 are of similar construction and each is mounted on a shaft 30 by means of an adjusting screw 30a. In the operation of these pick-up devices, the initial portion of the stroke or cycle comprises the lowering of the member 13 into a position to grasp the uppermost paper cup or container, and separate and withdraw it from the stack. In this operation, the member 13 is lowered into engagement with the uppermost cup, the force thereof depressing the stack against the action of the spring 9, the fingers or arm members 22 extending within the opposite cut-out portions 4 in the receptacle or casing 2.

By reason of the force imposed upon the member 13, the plunger 16 having its end 19 seating against the bottom or base of the cup or container 3, will be depressed against the action of the spring 17. This raising of the plunger 16 will cause the enlargement 21 to impinge against the reduced portion of the fingers forming an inwardly extending shoulder 25, so as to expand the fingers or arm members 22 and move them away from gripping contact with the cup or container 3. In order to positively separate the upper container 3 from the stack, the suction cup or gripping surface 20 of the head 19 is adapted to grip and twist the upper cup 3 from its stack so as to permit it to be readily raised therefrom. In order to twist the upper cup 3, the plunger 16 is provided with a pin 28 engaging and moving within an arcuate slot 29 in the casing 14. Thus as the plunger 16 is depressed when the pick-up device 13 is being lowered, the pin 28 and groove 29 will cause the plunger to turn within the casing 14, the surface 20 gripping and rotating or twisting the uppermost cup 3 during turning of the plunger 16, thereby to separate the cup from its stack even though these cups are in tightly nested relation.

A pinion or gear 31 is mounted or keyed upon the shaft 30. This pinion meshes with an idler pinion 32 mounted on the stub shaft 33, the pinion 32 in turn meshing with an idler pinion or gear 34 mounted on a stub shaft 35. Each of the shafts 30, 33, and 35 has bearing in spaced bracket members 36 mounted on or formed integral with an adjustable slide or slidable support 37. The pinion or gear 34 meshes with a rack 38 mounted on a slidable support or adjustable slide 39. By reason of the constructions of the slides or adjustable supports 37 and 39, the slide 37 with its bracket arms 36 carrying the pinions or gears 31, 32, and 34, and the pick-up device 13, and the slide 39 with its rack 38 in meshing engagement with the pinion or gear 34, may both be slid vertically whereby to accomplish the novel method of separating and delivering the paper cups 3.

In order to properly operate the pick-up or separating device 13 through its cycle of operations, the invention comprehends the provision of cam members 40 and 41, the cam 40 being provided with a groove or race 42 in which operates a pin 43 mounted on the slide 37, while the cam 41 is provided with a groove or race 44 in which operates a pin 45 mounted on the slide 39. As clearly disclosed in Fig. 2 of the drawings, the cams throughout approximately 210° to 240° have an identical contour of their grooves or races, so that from approximately the point marked "a" to the point marked "b" when considered in a counter-clockwise direction as shown in Fig. 2, the slides 37 and 39 operate in unison, this portion representing the portions of the operating cycle comprising the lowering of the pick-up device to separate and pick up or withdraw a container, and the raising of thick pick-up device with the container, so as to place it in a position where it may be readily swung or rotated to discharge the container. Thus as shown in Fig. 2, the arc or portion of the circumference intermediate the points a—b, it being understood that the cams are moving in a counter-clockwise direction, as shown by the arrow, represents the lowering of the slides 37 and 39 and their respective gears and rack, so that the pick-up device is raised to the position shown in Fig. 1 when the pins 43 and 45 are substantially in the position shown in Figs. 1 and 2.

From the point "b" to the point "a" in a counter-clockwise direction, the contour of the cams and their respective grooves or races differ. Thus, during the portion b—a of the cycle, the arc b—a being that of a circle having its center at the shaft 46, the slide 37 will be maintained stationary. However, the contour of the cam 41 and its groove or race is such as to operate its slide 39 and rack 38 whereby to drive the gears 34, 32, and 31 so as to rotate the shaft 30 and its pick-up device 13 through the arc as shown clearly in Fig. 1. This portion of the cycle of the operation takes place between the points a and d on the cam 41, while the portion from the points d to b on this cam will rotate the pick-up device back through the arc x to a position where the pick-up device is again ready to be lowered and to separate and withdraw a cup or container 3. Thus through the arc or a portion a—d of the cycle, the slide 39 and its rack 38 are lowered so as to rotate the gears 34, 32, and 31, which, during this time, are held against vertical movement, so as to rotate the pick-up device upwardly into the position shown in dotted lines in Fig. 1. The arc or portion d—b causes the slide 39 and its rack to again be raised so as to rotate the gears and pick-up device in an opposite direction so as to return the pick-up device to a position above the stack. By reason of this cam arrangement, the invention comprehends a positive operating means for carrying on the cycle of operation with a minimum number of operating parts.

The cams 40 and 41 are keyed to the shaft 46 and driven thereby. This shaft 46 has its bearing in a pedestal or support 47 which is provided with T-shaped supports 48 for housing and permitting sliding movement of the slides 37 and 39. In order to prevent displacement of the slides, the invention comprehends the provision of guide bars 49 to hold the slides in position. A bracket or pedestal 54 is also provided with a bearing member in its upper portion for the reception of the shaft 46.

Mounted upon the rear end of the shaft 46 but slidable longitudinally of the shaft, is provided a disk 50 upon the hub 51 of which is mounted a spring 52 bearing against the disk and against a washer or plate 53 seating against the bearing member at the top of the bracket 54. Thus this disk 50 is tensionally retained against the lock-nut 55 on the end of the shaft 46. This disk 50 is driven by means of a friction roller 56 mounted upon a shaft 57 seating within bearing members 58 and 59. A reducing gear 60 is mounted on the shaft 57 and is driven by means of a gear 61 mounted on a shaft 62 of any suitable power means such as an electric motor or the like (not disclosed), or the shaft 62 may be the drive shaft or any other suitable power means.

The disk 50 and the roller 56 may be of any suitable material employed for a friction drive. This friction drive provides a variable speed adjustment through a considerable range since the roller 56 may be adjusted radially upon the disk 50 so as to give approximately any driving speed desired. In order to accomplish such ready adjustment, the bearing member 59 is mounted upon the bracket 63 fastened to the motor mounting or platform 64 which is adjustable in relation to the main frame 1. Thus the entire motor mounting or platform 64, bearing member 59, shaft 57, gear 60 and roller 56 may be adjusted inwardly or to the left as shown in Fig. 3, whereby the roller 56 may drive the disk 50 at any desired speed.

As clearly disclosed in the drawings, the present embodiment comprises a dual unit in which a pair of pick-up members 13 are employed. In order to intercept and receive the paper cups 3 after they have been raised into a position shown by the dotted outline in Fig. 1, the invention includes a pair of tracks forming chutes or conveyors 65 which receive the cups. These chutes or conveyors are disposed at such an angle that the cups will readily slide down the same into a position instantly available for packing. In order to properly discharge the paper cup 3 after it has been raised to a position in engagement with the conveyors or chutes 65, these members are provided with a cut-out 66. This cut-out portion permits the fingers to enter between the sides or tracks 67 of the conveyor until the lower portion of the cup will engage against these sides whereupon the cup or container will be disengaged or forced from between the fingers and the cup will slide down the chute or conveyor.

From the above description and the disclosure in the drawings, it will be readily seen that the invention comprehends a new and novel means and method of separating individual containers or cups from a nested stack and delivering the containers or cups into a position where they are ready for packing. The present invention contemplates separating the cups from a stack in which the cups are in inverted position, withdrawing an individual cup and delivering it to a chute or other delivery device and discharging it thereon in an upright position.

Having thus disclosed the invention, I claim:

1. A mechanism for separating and delivering containers packed in inverted nested relation, comprising a pick-up mechanism including a member for causing an initial sliding movement between an outermost container and the pack and means for separating said container from the nested pack, and means for operating said mechanism whereby to deliver the container in upright position.

2. A mechanism for separating and delivering containers packed in nested relation, comprising a pick-up mechanism including a member for causing rotation between an outermost container and the pack and means for grasping and separating said container from the nested pack, and cam-operated means for separating the container during a part of the stroke of said means and delivering said container during another part of the stroke.

3. A mechanism for separating and delivering containers packed in nested relation, comprising means including a rotating member adapted to separate the individual containers by causing relative movement between a container to be separated and the remainder of the pack and arm members adapted to engage the opposite sides of the container for withdrawing the same longitudinally of the pack, and means for delivering said container ready for use.

4. In a mechanism for separating containers packed in nested relation, a device for separating and withdrawing individual containers comprising means for twisting the container and a pair of arms for grasping the exterior of said container and withdrawing the same from the pack.

5. In a mechanism for separating containers packed in inverted nested relation, a device for separating and withdrawing individual containers comprising a pair of arms for grasping the exterior of a container, and a plunger for twisting the container to loosen the container and permit the arms to withdraw the same from the pack and deliver the container in upright position.

6. In a mechanism for separating containers packed in nested relation, a device for separating and withdrawing individual containers comprising a pair of arms for grasping the exterior of a container, and a plunger engaging the bottom of the container so as to loosen the same from the pack.

7. In a mechanism for separating containers packed in nested relation, a device for separating and withdrawing individual containers comprising a pair of resilient arms adapted to grasp the sides of the container, a spring pressed plunger having gripping means at its end adapted to contact the bottom of the container, means for lowering said device whereby to depress the plunger, means on the plunger for distending the arms as the plunger is depressed, means for rotating the plunger as it is depressed whereby to twist the container thereby to loosen the same from the pack and means for raising the device to permit the plunger to be extended by its spring and the spring arms to grasp and withdraw the container.

8. In a mechanism for separating containers packed in nested relation, a device for separating and withdrawing individual containers comprising a pair of resilient arms adapted to grasp the sides of the container, a spring pressed plunger having gripping means at its end adapted to contact the bottom of the container, means for lowering said device whereby to depress the plunger, means on the plunger for distending the arms as the plunger is depressed, a pin on said plunger operating in an arcuate slot in said device whereby to rotate the plunger as it is depressed in the device and thereby to twist the container and loosen it from the pack, and means for raising the device to permit the plunger to be extended by its spring and the spring arms to grasp and withdraw the container.

9. In a mechanism of the class described, a device for separating, withdrawing and delivering a container from a nested stack thereof, and cam-operated mechanism for operating said device, said mechanism comprising a pair of cams, a slide for each of said cams and provided with a pin operating in a groove in said cams, a rack mounted on one of said slides and said device and a gear in meshing engagement with said rack mounted on the other of said slides.

10. In a structure for separating and delivering containers from a nested stack thereof, a device adapted to separate, withdraw and deliver a container from the stack and mechanism for operating said device, said mechanism comprising a pair of cams having a portion of their circumference of like contour, a slide for each of said cams and provided with a pin operating in a groove in said cams whereby said cams drive said slides, a rack mounted on one of said slides and said device and a gear in meshing engagement with said rack mounted on the other of said slides, said cams being so formed whereby during a portion of the stroke of said cams both slides are moved downwardly together whereby to separate and grasp a container, during the succeeding portion of the stroke both slides are moved upwardly together to withdraw a container, during the succeeding portion of the stroke the slide carrying said device and gear are held in the upper position and the slide carrying the rack bar is lowered to rotate the device upwardly and discharge the container and during the final portion of the stroke the slide carrying said device and gear remains in its upper position and the slide carrying the rack bar is raised to rotate the device downwardly to a position where it may again be lowered to separate a container.

11. In a structure for separating and delivering containers from a nested stack thereof, a device including a member adapted to engage and cause relative movement between a container to be separated and the stack and means to withdraw and deliver said container from the stack, and mechanism for operating and moving said device in a predetermined cycle whereby to cause said relative movement, withdrawal and delivery of said container in sequence, said mechanism imparting to said device a predetermined cyclic movement whereby during a portion of the cycle said device is lowered to engage a container and cause relative movement therebetween and the stack, during the succeeding portion of the cycle the device is raised to withdraw said container, during the next succeeding portion of the cycle the device is rotated upwardly and discharges the container, and during the remaining portion of the cycle the device is rotated downwardly to a position ready to again be lowered to separate a container.

12. In a mechanism for separating containers packed in nested relation, comprising means engaging the bottom of a container whereby to loosen it from the pack, and means engaging the sides of said container for separating and withdrawing said container.

13. A mechanism for separating and delivering containers packed in nested relation, comprising a member for rotating the uppermost container relative to the pack and thereby loosening the same from the pack, arms adapted to grasp the sides of said container for separating the same from the pack, and means for operating said separating means for delivering the separated container.

14. In a mechanism for separating containers packed in nested relation, comprising a member for rotating a container relative to the pack and thereby loosening the same from the pack, and arm members adapted to grasp the sides thereof for vertically withdrawing and separating said container therefrom.

15. In a mechanism for separating containers pecked in nested relation, comprising a rotatable member engaging the bottom of a container whereby to rotate the same relative to the pack and thereby loosen it from the pack, and fingers engaging the sides thereof for separating and withdrawing said container longitudinally of the pack.

16. A mechanism for separating and delivering containers packed in nested relation, comprising gripping means including a rotatable member for engaging a container to be separated from the pack and rotating said container relative to the nested pack and means for separating said container from the nested pack, and means for operating said gripping means to deliver the separated container.

17. A structure of the class described, comprising mechanism including a member for engaging and twisting an individual container whereby to loosen the same from a nested pack and means for withdrawing said loosened container, and means for rotating said mechanism after said container has been withdrawn and delivering said container ready for packing.

18. A mechanism of the class described, comprising a pick-up device including a member for engaging and twisting an individual container whereby to loosen the same from a stack and means for withdrawing said loosened container longitudinally of the stack, and cam-operated mechanism for operating said pick-up device to separate, withdraw and deliver the individual containers.

19. A mechanism of the class described, comprising a device including a rotating member for rotating an individual container in a nested stack and gripping arms for grasping the sides thereof and lifting and withdrawing said individual container from the stack, and mechanism for delivering each individual container after it has been withdrawn.

20. A mechanism for separating and delivering containers packed in nested relation, comprising a rotating member adapted to engage a container to be separated and to cause relative movement between said container and the remainder of the pack, fingers adapted to grasp the sides of said container for withdrawing the same longitudinally of the nested pack and means for delivering said separated container ready for use.

CLYDE S. BRANDENBURG.